(12) United States Patent
Borg et al.

(10) Patent No.: US 8,739,678 B2
(45) Date of Patent: Jun. 3, 2014

(54) HOOD-LIFTING ACTUATOR WITH DISARMABLE RETURN BRAKING ARRANGEMENT

(75) Inventors: Evrard Borg, Martignas sur Jalle (FR); Eric Laspesa, Sorgues (FR); Jean-Paul Nadeau, Saint Medard en Jalles (FR)

(73) Assignee: Herakles, Le Haillan (FR)

( * ) Notice: Subject to any disclaimer, the term of this patent is extended or adjusted under 35 U.S.C. 154(b) by 528 days.

(21) Appl. No.: 12/922,831

(22) PCT Filed: Mar. 17, 2009

(86) PCT No.: PCT/FR2009/050430
§ 371 (c)(1),
(2), (4) Date: Sep. 15, 2010

(87) PCT Pub. No.: WO2009/122080
PCT Pub. Date: Oct. 8, 2009

(65) Prior Publication Data
US 2011/0011256 A1    Jan. 20, 2011

(30) Foreign Application Priority Data
Mar. 18, 2008  (FR) ...................................... 08 51734

(51) Int. Cl.
*F15B 15/19*    (2006.01)
*F15B 15/22*    (2006.01)

(52) U.S. Cl.
USPC ................................................ 91/356; 92/15

(58) Field of Classification Search
USPC .......... 91/356; 180/274, 69.21; 293/118, 119; 92/15–29, 85 R, 85 A
See application file for complete search history.

(56) References Cited

U.S. PATENT DOCUMENTS

| | | | |
|---|---|---|---|
| 3,470,793 A | * | 10/1969 | Hanchen .......................... 92/20 |
| 4,577,732 A | * | 3/1986 | Gottling .......................... 188/67 |

(Continued)

FOREIGN PATENT DOCUMENTS

| | | | |
|---|---|---|---|
| DE | 102006028754 | * 12/2007 | ............. B60R 21/38 |
| EP | 1201506 | 5/2002 | |

(Continued)

OTHER PUBLICATIONS

International Search Report of Application No. PCT/FR2009/050430, dated Oct. 15, 2009, pages.

(Continued)

*Primary Examiner* — Thomas Denion
*Assistant Examiner* — Shafiq Mian
(74) *Attorney, Agent, or Firm* — Hamre, Schuman, Mueller & Larson, P.C.

(57) ABSTRACT

The triggered stroke actuator comprises a cylinder (12) housing a movable assembly constituted by a piston (13), a rod (16) projecting from one end of the cylinder (12), and a slidable element (17) that is movable inside the cylinder (12). The actuator also includes means for propelling the piston (13) in response to a trigger command, and a return braking arrangement. The return braking arrangement is constituted by at least one ball (18) housed in an annular cavity (19) defined by the inside surface of the cylinder (12) and by the slidable element (17), a return spring (22) connecting the slidable element (17) to the piston (13), and a link element (23) connecting the ball (18) to the piston (13). The ball (18) is positioned by the link element (23) in a first segment (20) of the annular cavity (19) when the return spring (22) is relaxed, and in a second segment (21) of decreasing radial extent when the return spring (22) is compressed. Thus, the braking arrangement is released when the force applied to the piston (13) drops below a threshold value.

14 Claims, 2 Drawing Sheets

(56) References Cited

U.S. PATENT DOCUMENTS

| | | | | |
|---|---|---|---|---|
| 5,363,736 A * | 11/1994 | Huang | | 89/1.14 |
| 6,186,047 B1 * | 2/2001 | Baruffaldi | | 92/24 |
| 6,467,267 B2 * | 10/2002 | Kanazawa et al. | | 60/552 |
| 6,910,558 B2 * | 6/2005 | Wang et al. | | 188/300 |
| 6,942,056 B2 * | 9/2005 | Nadeau et al. | | 180/274 |
| 7,413,049 B2 * | 8/2008 | Schramm et al. | | 180/274 |
| 7,814,751 B2 * | 10/2010 | Ebert | | 60/562 |
| 8,181,666 B2 * | 5/2012 | Negishi et al. | | 137/251.1 |
| 2005/0264036 A1 * | 12/2005 | Kramarczyk et al. | | 296/187.03 |
| 2008/0284242 A1 * | 11/2008 | Ganzel | | 303/114.1 |

FOREIGN PATENT DOCUMENTS

| | | |
|---|---|---|
| EP | 1431136 | 6/2004 |
| FR | 1373484 | 9/1964 |

OTHER PUBLICATIONS

Written Opinion of Application No. PCT/FR2009/050430, dated Oct. 15, 2009, pages.

* cited by examiner

HOOD-LIFTING ACTUATOR WITH DISARMABLE RETURN BRAKING ARRANGEMENT

The invention relates to a triggered stroke actuator for incorporating in a safety system having the purpose of protecting a pedestrian in the event of a frontal impact against a motor vehicle. More particularly, the invention relates to improving such an actuator so as to enable the safety system to be returned to its original position after it has been triggered, when circumstances make that possible, and in particular after a false detection or in the event of the obstacle being avoided.

Patent FR 2 878 212 describes a safety system for protecting a pedestrian in the event of the pedestrian being struck by a motor vehicle. That system includes a mechanism that enables the hood of the motor vehicle to be raised rapidly in the event of a collision. Under such circumstances, the head of a pedestrian frequently strikes the vehicle hood. The impact of the head on the hood causes the hood to deform. Beyond a certain amount of deformation, the hood comes into contact with the engine block and all of the rigid parts that surround the engine. It is at that moment that the pedestrian's head is subjected to the greatest deceleration that can lead to severe injury of the victim. That is why the above-mentioned system is designed to raise the hood suddenly through a certain height so as to avoid the pedestrian, and in particular the pedestrian's head, striking the engine block as the hood is deforming. The hood is raised from its rear end, i.e. from beside the windshield, with the hood remaining fastened to the front of the motor vehicle.

Thus, if such a safety device is actuated in time by appropriate detector means, it enables the hood to be raised through 80 millimeters (mm) in less than 30 milliseconds (ms), i.e. in a very short interval of time after an imminent impact has been detected.

After the hood has been raised, it is also known to make provision for the hood to return in damped manner, possibly accompanying the impact on the hood, so as to lessen the effect of the impact thereon. The return damping system is advantageously combined with the actuator used for raising the hood. In this way, the assembly constituted by the hood, the raising mechanism, and the actuator piston retracts under the effect of the impact (after the hood has been raised) while simultaneously being braked and then blocked. The damper device is arranged in the cylinder between the piston and the rod, thereby minimizing the space it occupies and at negligible extra expense.

Nevertheless, it can happen that the above-described safety system is actuated, and consequently that the hood is raised, without an accident actually taking place, e.g. in the event of an erroneous detection or if the pedestrian does not strike the hood. Under such circumstances, after the incident, it is desirable for the driver to be capable of returning the hood to its initial position (given that the hood has not been deformed), and for this to be possible in a manner that is simple and intuitive.

An object of the present invention is to provide a safety system that incorporates a triggered stroke actuator and that enables the hood to be returned to its initial position in the event of there being no impact. In particular, the actuator of the invention includes a return braking arrangement capable of being released automatically after a certain amount of time has elapsed since the hood was raised. When the braking arrangement is released in this way the (non-deformed) hood may be lowered back into its initial position without taking any particular precautions, or it may close automatically under the effect of its own weight.

A triggered stroke actuator of the invention is of the type comprising a cylinder housing a movable assembly constituted by a piston and a rod projecting from one end of said cylinder, means for propelling said piston in response to a trigger command, and a return braking arrangement, and it is characterized: in that the movable assembly comprises a slidable element that is movable in said cylinder; in that the return braking arrangement comprises at least one ball housed in an annular cavity defined by the inside surface of said cylinder and by said slidable element, said cavity having two adjacent segments extending one another, a first segment having a radial extent that is greater than the diameter of said ball and a second segment having a radial extent that decreases going away from the end of said first segment; in that the return braking arrangement includes a return spring connecting said slidable element to said piston; and in that the return braking arrangement further includes a link element connecting the at least one ball to the piston, the ball being constrained to move with the link element and being positioned by the link element in said first segment of the annular cavity when the return spring is relaxed, and in the second segment when the return spring is compressed; whereby the braking arrangement is released when the force applied on the piston drops below a threshold value.

The piston, the slidable element, and the rod may be formed by three independent parts that are longitudinally spaced apart from one another inside the cylinder in that order.

Advantageously, the force applied to the piston results from the pressure that exists in a gas expansion chamber after a gas generator has operated, with the piston constituting a wall of the chamber. This applies for example to actuators of conventional type, in which the means for propelling the piston in response to a trigger command comprise a pyrotechnically actuated gas generator mounted inside the body facing the piston, and this also applies to pneumatically actuated actuators. In this manner, the braking arrangement is released when the pressure inside the piston chamber drops below a threshold value. When using a pyrotechnically actuated gas generator, the mere cooling of the gas may serve to enable this threshold value to be reached after a certain length of time.

Preferably, the actuator includes a calibrated leakage orifice designed to lower the level of pressure inside the gas expansion chamber progressively and thus to release the return braking arrangement. The leakage orifice may be particularly useful for pyrotechnically actuated actuators in which the cooling of the gas after combustion does not lead to a sufficient reduction in volume to enable the piston to return quickly to its initial position. The leakage orifice may be formed through the actuator cylinder. In particular, the leakage orifice may be formed thorough the actuator cylinder constituting the wall of the gas expansion chamber, and it may be located beside the gas generator. In a variant, the leakage orifice may alternatively be positioned so as not to be in contact with the gas expansion chamber before the actuator has been triggered. This variant serves to avoid losing energy when the actuator is triggered. As an alternative, the leakage orifice may be provided in the body of the piston. Under such circumstances, the combustion gas is evacuated through the orifice towards the hood. Furthermore, since the actuator cylinder is not open to the outside, potential problems associated with sealing are solved.

In an advantageous provision of the invention, the link element is made up of a material that is deformable or breakable. For example, this may be a return spring or a piece of foam. Advantageously, the link element may be constituted by an annular support forming a tube that is mounted to move inside said cavity and that holds said balls.

In another advantageous provision, the slidable element exerts resistance to being moved that is greater than the force exerted by the return spring. In particular, this resistance to moving may be increased by implanting a friction member at the surface of the slidable element that is situated facing the inside wall of the actuator cylinder.

In a first variant of the invention, the slidable element and the rod form a single part.

In a second variant of the invention, the link element and the rod form a single part and a second cavity is formed at the periphery of the rod, extending the second segment of the first annular cavity defined by the inside surface of the actuator cylinder and by the slidable element. The piston is housed in said second cavity, with one of the faces of the piston being connected to at least one ball via a link element and with the other face of the piston being connected to the rod via a return spring.

The present invention considerably improves the use of known safety systems in the event of there being no impact, since it enables the hood to be returned to its initial position a certain length of time after it has been raised, either manually or automatically under the effect of its own weight. After the system has been triggered erroneously, the force exerted on the piston will decrease progressively, e.g. because of the combustion gas cooling or because of the gas or fluid contained in the piston chamber escaping via a leakage orifice formed through the cylinder of the actuator or through the body of the piston. When this force drops back to a value below the threshold value at which the balls are replaced in the first segment of the annular cavity by the spring relaxing, the return braking system is released. Thus, after a given amount of time has elapsed, return of the hood towards its initial position can no longer be braked, regardless of the force applied to lower the hood.

Furthermore, when the weight of the hood suffices to return it to its initial position, it is not essential for the driver to act thereon and it is possible to continue driving without stopping the vehicle, once the return braking system has been released and the hood has moved back down again.

The invention can be better understood and other advantages thereof appear better in the light of the following description of several embodiments of an actuator in accordance with the principle of the invention, given purely by way of example and made with reference to the accompanying drawings, in which.

Figure 1:
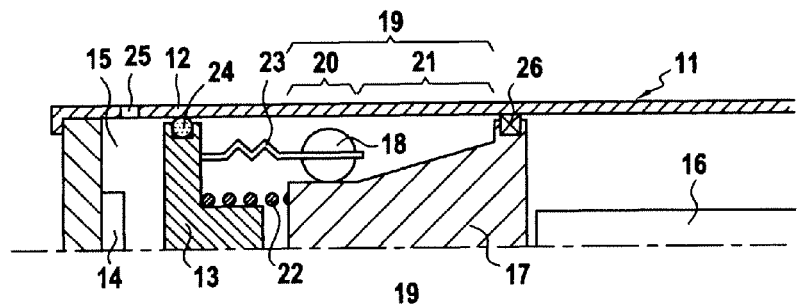
FIG. 1 is a diagrammatic general view in longitudinal section of an actuator in accordance with the invention.

FIG. 1 shows an actuator 11 in accordance with the invention. The actuator is constituted by: a cylinder 12 containing a piston 13 mounted facing a gas generator 14; a gas expansion chamber 15 arranged between the generator 14 and the piston 13; a rod 16 projecting axially from one end of the cylinder; and a slidable element 17 housed between the piston 13 and the rod 16. In this embodiment, the slidable element 17 is independent and located between the rod 16 and the piston 13.

At least one ball 18 is housed in an annular cavity 19 defined both by the actuator cylinder 12 and by the slidable element 17. This cavity is made up of a first segment 20 of radial extent that is slightly greater than the diameter of the ball, and of a second segment 21 of radial extent that decreases starting from the end of the first segment 20. Preferably, a plurality of balls are provided that are arranged in a ring. A compression spring 22 is interposed between the piston 13 and the slidable element 17. A link element 23 connects the piston 13 to the plurality of balls 18. The return spring 22 and the link element 23 are connected to the same face of the piston 13 that faces the slidable element 17. The dimensions of the link element 23 are selected as follows: the link element positions the balls 18 in the first segment 20 of the annular cavity 19 when the spring 22 is relaxed, and in the second segment 21 of the cavity 19 when the spring 22 is compressed. The link element 23 needs to present stiffness that is sufficient to ensure that the balls 18 are constrained to move therewith in the longitudinal direction when the spring 22 compresses or expands in response to a variation in the force exerted on the piston 13. The balls 18 are thus linked to move together with the link element 23 by direct contact such that the distance between the balls 18 and the piston 13 is kept constant. After an impact, the balls are inserted by force into the narrowest portion of the second segment 21 of the annular cavity 19 so as to brake and then block the return of the piston 13. The link element 23 must be capable of deforming so as to follow the movement of the balls or so as to break in order to release them. Consequently, the link element may be a spring, a piece of foam or of plastics material, or any other element that satisfies the above-specified conditions. Alternatively, the link element may be constituted by a cage supporting the balls.

In its periphery, the piston 13 is provided with at least one groove suitable for receiving an O-ring 24, providing sealing between the gas expansion chamber 15 and the annular cavity 19. The gas expansion chamber 15 is provided with a calibrated leakage orifice 25 serving to determine how the pressure inside said chamber 15 drops as a function of time after the gas generator 14 has operated. This orifice 25 is dimensioned as a function of numerous parameters such as the desired speed of release and the gas involved. With certain pyrotechnic actuators, the cooling of the gas gives rise to a sufficient reduction in volume to release the braking arrangement, making recourse to a leakage orifice superfluous.

A friction member 26 is also located at the periphery of the slidable element 17. Its function is to increase resistance to movement presented by the slidable element 17 when sliding along the inside wall of the actuator cylinder 12.

Such provisions define a return braking arrangement that may be released when the force acting on the piston 13 decreases so as to drop below a threshold value. This is shown in FIGS. 2 to 6.

Figure 2:
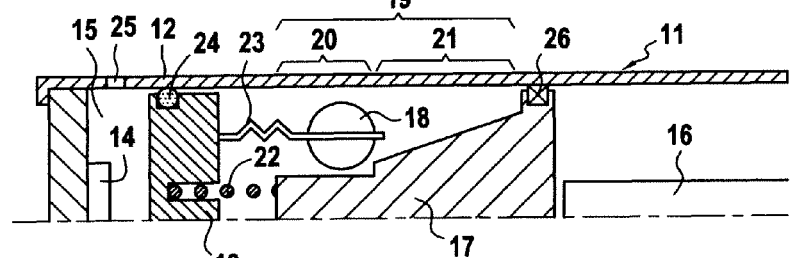
FIGS. 2 to 6 are diagrammatic views showing the operation of the return braking arrangement.
Figure 3:
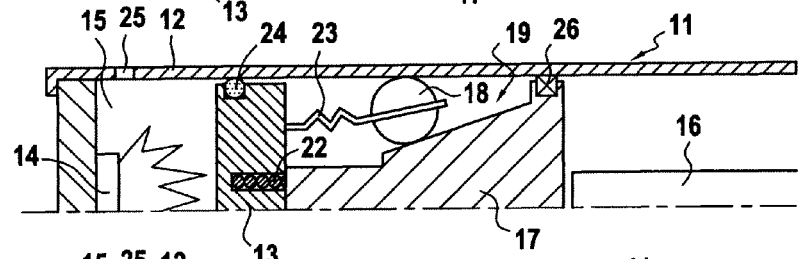

FIG. 2 shows a pyrotechnically actuated actuator in accordance with the present invention while at rest. Initially, the pressure in the gas expansion chamber 15 is equal to atmospheric pressure, such that the return spring 22 is relaxed. The link element 23 serves to position the balls 18 in the first segment 20 of the annular cavity 19 as defined by the inside surface of the actuator cylinder 12 and by the slidable element 17. In the event of an impact, the gas generator 14 is triggered, the pressure reaches a very high value almost instantaneously, and the spring 22 compresses. At this moment, the piston 13 moves relative to the slidable element 17 so as to come into contact therewith. Since the balls 18 are constrained to move with the piston 13 by the suitably stiff link element 23, they also move towards the second segment of the annular cavity 19 and end up engaging therein. At this moment, the return braking system is engaged (FIG. 3).

Figure 4:
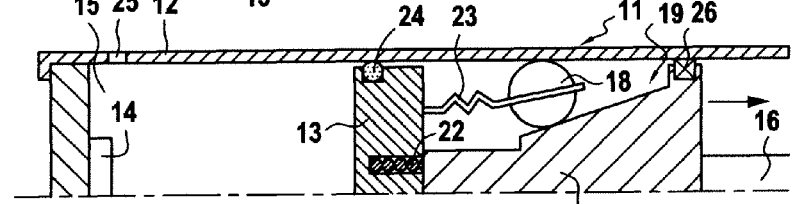

FIG. 4 shows the actuator deployment stage. The return spring 22 is compressed and the piston 13 entrains both the slidable element 17 and the rod 16 together.

Figure 5:
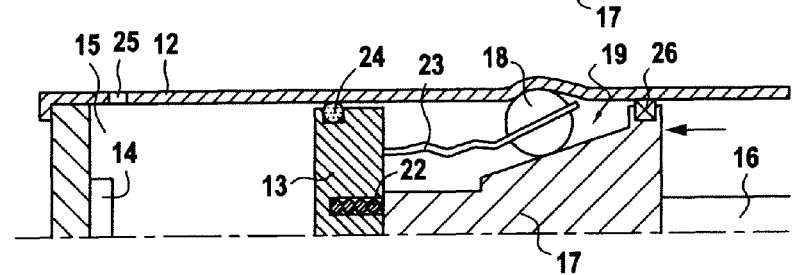

FIG. 5 shows the operation of the return braking arrangement in the event of an impact on the hood occurring while the pressure in the expansion chamber 15 is greater than the threshold value. The friction against the inside surface of the cylinder 12 and the small amount of pressure exerted by the link element 23 during return of the piston cause the balls 18 to move into the second segment 21 of the annular cavity 19. They begin by braking the return of the rod 16 by pressing against the cylinder 12, and then they block it in place by deforming said cylinder. During this braking process, the link element 23 that is holding the balls 18 deforms in order to follow their movement.

Figure 6:
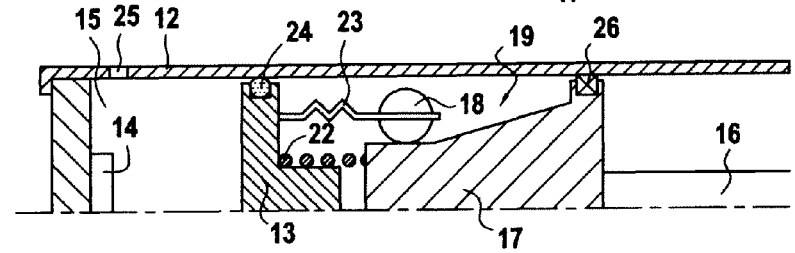

FIG. 6 shows the state of the actuator after it has been deployed and in the event of there being no impact, with the pressure inside the expansion chamber 15 having dropped back below the threshold pressure. The return spring 22 connecting the piston 13 to the slidable element 17 is once more relaxed and the piston 13 is spaced apart from the slidable element 17, thereby taking the balls 18 back into the first segment 20 of the annular cavity 19. The return braking arrangement is thus disengaged, and the hood can be returned without effort to its initial position.

Figure 7:
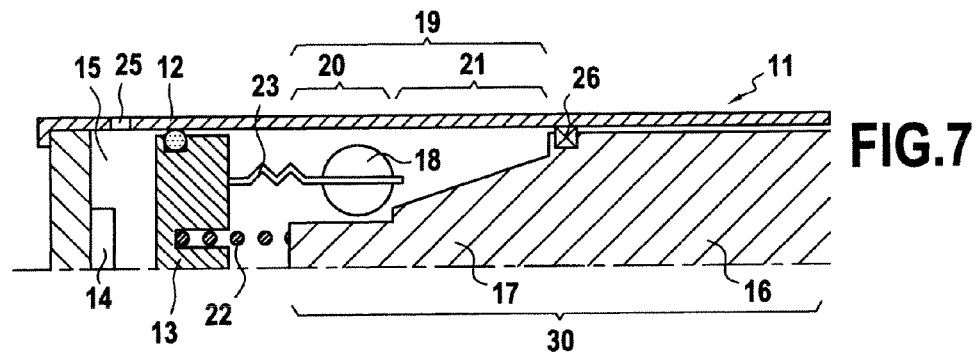
FIG. 7 shows a first variant embodiment of a triggered stroke actuator of the present invention.
Figure 8:
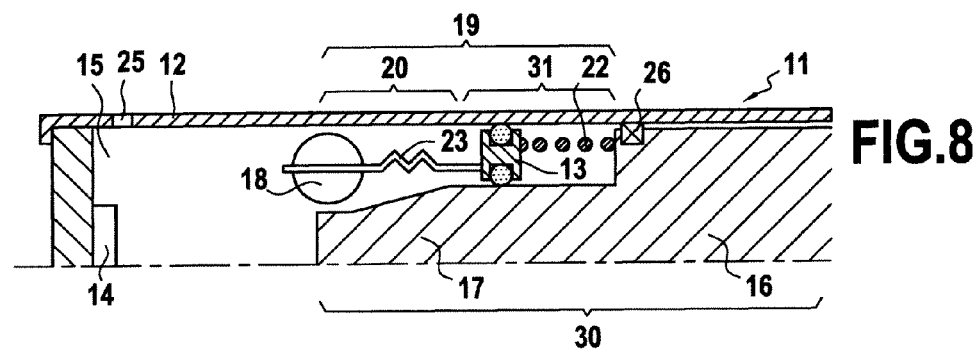
FIG. 8 shows a second variant embodiment of an actuator of the invention.
Figure 9:
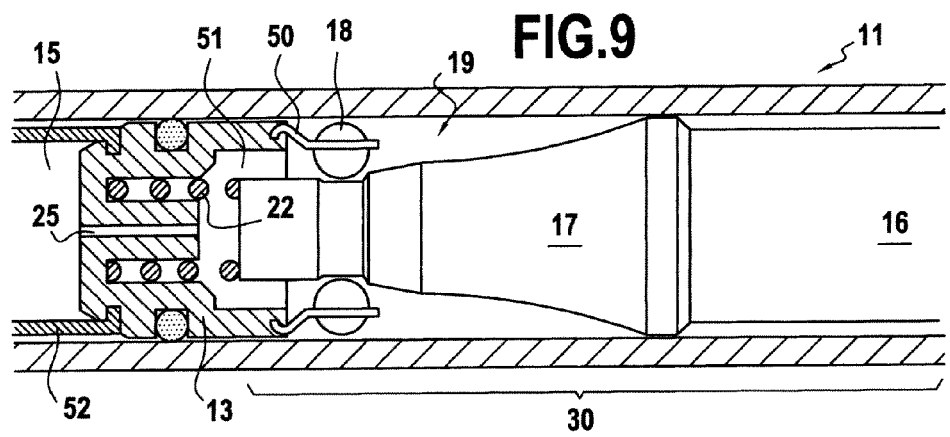
FIG. 9 shows an assembly variant.

FIGS. 7 to 9 show three variant embodiments of triggered stroke actuators of the present invention.

In a first variant shown in FIG. 7, the slidable element 17 and the rod 16 form a single part 30. The return spring 22 and the link element 23 are also connected to the same face of the piston 13 facing said slidable part 30. The operation of the braking arrangement is completely identical to that described above.

The second variant shown in FIG. 8 constitutes a particular version of the first variant described above. Here, likewise, the slidable element 17 and the rod 16 form a single part 30. However, the return spring 22 and the link element 23 are connected respectively to two opposite faces of an annular piston 13. More precisely, the annular cavity 19 defined by the actuator cylinder 12 and the slidable element 17 is extended by a second cavity 31 formed by the periphery of the rod and containing the piston 13. One of the faces of the piston 13 (facing the gas generator 14) is connected to the balls 18 via the link element 23, while the opposite face of the piston is connected to the rod 16 by the return spring 22. In this second variant, the force that results from the pressure increase in the expansion chamber 15 applies both to the piston 13 and to the single part 30 formed by the slidable element 17 and the rod 16, given that the piston is annular and situated in a cavity in said rod.

In an assembly variant similar to that of FIG. 7, and as shown in FIG. 9, the balls are housed in an annular support 50 forming a tube that is mounted to move in the annular cavity 19. The tube in this variant performs the function of the link element. Furthermore, the leakage orifice 25 in this variant is provided in the body of the piston. After combustion, the gas is evacuated through the orifice 25 towards the hood, thereby enabling the return braking arrangement to be released.

The spring 22 is housed in a cavity 51 of the piston 13. Prior to the gas generator 14 being triggered, the piston is held in a rest position that is predetermined by a breakable annular element 52. The gas expansion chamber 15 thus has a predetermined minimum volume, and the piston 13 moves only once the pressure has reached a certain value.

The invention claimed is:

1. A triggered stroke actuator of the type comprising a cylinder housing a movable assembly comprising a piston and a rod projecting from one end of said cylinder, a propelling unit which is located on one side of said piston and which can provide a propelling force to said piston in response to a trigger command, and a return braking arrangement, wherein:
the movable assembly further comprises a slidable part that is movable in said cylinder;
the return braking arrangement comprises at least one ball housed in an annular cavity defined by the inside surface of said cylinder and by said slidable part, said cavity having two adjacent segments extending one another, a first segment having a radial extent that is greater than the diameter of said ball and a second segment having a radial extent that decreases going away from the end of said first segment;
the return braking arrangement further includes a return spring connecting said slidable part to said piston, so that compression and relaxation of the return spring results in a relative movement of the piston and the slidable part; and
the return braking arrangement further includes a link connecting the at least one ball to the piston, the ball being constrained to move with the link and being positioned by the link in said first segment of the annular cavity when the return spring is relaxed, and in the second segment when the return spring is compressed;
wherein when the braking arrangement is released when the propelling force applied on the piston drops below a threshold value.

2. An actuator according to claim 1, wherein the propelling force applied to the piston results from pressure that exists in a gas expansion chamber after a gas generator has operated, with the piston constituting a wall of the chamber.

3. An actuator according to claim 1, wherein the return braking arrangement comprises a plurality of balls and said balls are housed in an annular support forming a tube, mounted to move in said cavity.

4. An actuator according to claim 1, wherein said link is made up of a material that is deformable or breakable.

5. An actuator according to claim 1, wherein the piston, the slidable part, and the rod form three independent parts that are longitudinally spaced apart from one another inside the body in that order.

6. An actuator according to claim 1, wherein said slidable part and said rod form a single part.

7. An actuator according to claim 6, wherein a second cavity is formed at the periphery of the rod, extending the second segment of the first annular cavity defined by the inside surface of said cylinder and by said slidable part, the piston being housed in said second annular cavity of the rod, and one of the faces of the piston being connected to at least one ball via a link and the other face being connected to the rod via a return spring.

8. An actuator according to claim 1, wherein said slidable part exerts resistance to movement that is greater than force exerted by said return spring.

9. An actuator according to claim 1, wherein a friction member is disposed at the periphery of the slidable part.

10. An actuator according to claim 1, wherein said propelling unit comprises a pyrotechnically actuated gas generator mounted in said cylinder facing said piston.

11. An actuator according to claim 2, further comprising a calibrated leakage orifice for lowering the level of pressure inside the gas expansion chamber progressively.

12. An actuator according to claim 11, wherein the leakage orifice is formed in the actuator cylinder constituting a wall of the gas expansion chamber beside the gas generator.

13. An actuator according to claim 11, wherein the leakage orifice is positioned in the actuator cylinder in such a manner as to make no contact with the gas expansion chamber prior to the actuator being triggered.

14. An actuator according to claim 11, wherein the leakage orifice is formed in the piston.

* * * * *